(12) United States Patent
Seitel (10) Patent No.: US 7,817,704 B2
(45) Date of Patent: Oct. 19, 2010

(54) MONOBLOCK LASER WITH IMPROVED ALIGNMENT FEATURES

(75) Inventor: Steven C. Seitel, Bozeman, MT (US)

(73) Assignee: Scientific Materials Corporation, Bozeman, MT (US)

( * ) Notice: Subject to any disclaimer, the term of this patent is extended or adjusted under 35 U.S.C. 154(b) by 485 days.

(21) Appl. No.: 11/371,457

(22) Filed: Mar. 9, 2006

(65) Prior Publication Data

US 2006/0280221 A1      Dec. 14, 2006

Related U.S. Application Data

(60) Provisional application No. 60/662,691, filed on Mar. 17, 2005.

(51) Int. Cl.
*H01S 3/08* (2006.01)
(52) U.S. Cl. .................. 372/100; 372/107
(58) Field of Classification Search .......... 372/107, 372/100
See application file for complete search history.

(56) References Cited

U.S. PATENT DOCUMENTS

| | | | |
|---|---|---|---|
| 3,641,458 A | 2/1972 | La Tourrette et al. | |
| 4,030,046 A | 6/1977 | Firester | |
| 4,420,836 A | 12/1983 | Harper | |
| 4,731,795 A * | 3/1988 | Clark et al. | 372/107 |
| 5,181,211 A | 1/1993 | Burnham et al. | 372/21 |
| 5,249,195 A | 9/1993 | Feldman et al. | 372/45.01 |
| 5,260,954 A | 11/1993 | Dane et al. | |
| 5,265,113 A | 11/1993 | Halldorsson et al. | |
| 5,414,724 A | 5/1995 | Zhou et al. | |
| 5,436,920 A | 7/1995 | Minemoto et al. | 372/21 |
| 5,596,404 A | 1/1997 | Beck et al. | |
| 5,608,744 A | 3/1997 | Hovis et al. | 372/21 |
| 5,675,594 A | 10/1997 | Hovis et al. | 372/22 |
| 5,679,964 A | 10/1997 | Kobayashi et al. | 257/83 |

(Continued)

FOREIGN PATENT DOCUMENTS

JP   2006073962   3/2006

OTHER PUBLICATIONS

Office Action related to U.S. Appl. No. 11/340,305, dated Oct. 3, 2006.

(Continued)

*Primary Examiner*—Minsun Harvey
*Assistant Examiner*—Joshua King
(74) *Attorney, Agent, or Firm*—Haynes and Boone, LLP (57) ABSTRACT

A laser resonator has a support disposed on its axis, to support an adjustable element rotatable with respect to the axis. An HR mirror reflects light, which passes through gain element means and partially through an OC mirror to provide a laser output. The adjustable element is fixed in rotation upon reaching a pre-selected laser output. One embodiment features a support comprising a recess in the substrate of the resonator, and one of the mirrors is formed on the spherically shaped bottom of the adjustable element. Alternatively, the adjustable element comprises a first Risley wedge pair rotatable within a V-block shaped support. Alternatively, a recess in the substrate supports the HR mirror and a Risley wedge pair.

Both embodiments and their variations apply to two stage resonators, which then include a second support, appropriately placed wavelength shifting means and other optional optical elements.

54 Claims, 7 Drawing Sheets

U.S. PATENT DOCUMENTS

| | | | |
|---|---|---|---|
| 5,754,333 | A | 5/1998 | Fulbert et al. ............... 359/330 |
| 5,841,798 | A | 11/1998 | Chen et al. .................... 372/11 |
| 5,953,362 | A | 9/1999 | Pamulapati et al. ........... 372/96 |
| 6,031,853 | A | 2/2000 | Greene et al. ................. 372/22 |
| 6,170,795 | B1 | 1/2001 | Wayne ........................ 248/664 |
| 6,212,212 | B1 | 4/2001 | Honmou ................... 372/43.01 |
| 6,317,278 | B1 | 11/2001 | Metsala ....................... 359/813 |
| 6,373,865 | B1 | 4/2002 | Nettleton et al. .............. 372/10 |
| 6,377,593 | B1 | 4/2002 | Peterson et al. ............... 372/11 |
| 6,501,772 | B1 * | 12/2002 | Peterson ....................... 372/10 |
| 6,536,736 | B2 | 3/2003 | Wayne et al. ............... 248/664 |
| 6,556,614 | B2 * | 4/2003 | Nettleton et al. ............ 372/107 |
| 6,570,895 | B2 * | 5/2003 | Heberle ........................ 372/34 |
| 6,669,367 | B2 | 12/2003 | Lin et al. ...................... 383/14 |
| 6,710,914 | B2 | 3/2004 | Arbore et al. ................ 359/330 |
| 6,735,234 | B1 | 5/2004 | Paschotta et al. .............. 372/75 |
| 6,744,801 | B2 | 6/2004 | Nettleton et al. .............. 372/50 |
| 6,754,418 | B1 | 6/2004 | Holm et al. ................... 385/49 |
| 6,778,581 | B1 | 8/2004 | Lipson ......................... 372/96 |
| 6,826,329 | B2 | 11/2004 | Imada ........................... 385/35 |
| 6,839,493 | B2 | 1/2005 | Berto ............................ 385/52 |
| 6,900,472 | B2 | 5/2005 | Kondoh et al. ................ 257/94 |
| 2002/0110159 | A1 | 8/2002 | Gerstenberger et al. |
| 2003/0138012 | A1 | 7/2003 | Wang et al. ................... 372/39 |
| 2004/0066805 | A1 | 4/2004 | Afzal et al. ................... 372/10 |
| 2004/0218652 | A1 | 11/2004 | Spariosu et al. ............... 372/70 |
| 2004/0233961 | A1 | 11/2004 | Lutgen |
| 2006/0092991 | A1 | 5/2006 | Nettleton ..................... 372/10 |
| 2006/0092992 | A1 | 5/2006 | Nettleton ..................... 372/10 |
| 2006/0280221 | A1 | 12/2006 | Seitel ......................... 372/100 |
| 2009/0016385 | A1 | 1/2009 | Sakai et al. |

OTHER PUBLICATIONS

Office Action related to U.S. Appl. No. 11/340,305, dated May 18, 2007.

Office Action related to U.S. Appl. No. 11/340,305, dated Sep. 21, 2007.

Office Action related to U.S. Appl. No. 11/340,305, dated Mar. 18, 2008.

Office Action related to U.S. Appl. No. 11/340,305, dated Jul. 9, 2008.

Office Action related to U.S. Appl. No. 11/340,305, filed Jan. 8, 2009.

"Monoblock laser for a low-cost, eyesafe, microlaser range finder", by J. Nettleton et al., *Applied Optics*, vol. 39, No. 15, May 20, 2000, pp. 2428-2432.

*Fundamentals of Optics*, $3^{RD}$ Ed., F. Jenkins et al., 1957, pp. 24-25.

U.S. Appl. No. 11/513,637, Randy W. Equall.

Zheng et al. "LD-pumped single frequency passively Q-switched green laser," Optics & Laser Technology, 34, (2002) 452-427.

Taira et al., Passively Q-switched Nd: YAG microchip laser over 1-MW peak output power for micro drilling. 2006 Optical Society of America, 2 pages.

Mayorga-Cruz et al., Kinetics of a solid-state laser with polarizable saturable absorber, Optics Express, vol. 9, No. 9, Oct. 22, 2001, 8 pages.

* cited by examiner

MONOBLOCK LASER WITH IMPROVED ALIGNMENT FEATURES

CROSS-REFERENCE TO RELATED APPLICATION

The present application is based on and claims the benefit of U.S. provisional patent application Ser. No. 60/662,691, filed Mar. 17, 2005, the content of which is hereby incorporated by reference in its entirety.

BACKGROUND OF THE INVENTION

The present invention relates to solid state lasers having an output in the near infrared, especially those lasers which have a compact size and have a high peak output power.

Recent advances in lasers have led to monoblock lasers which feature a number of optical elements assembled on a substrate to provide a single piece laser of a compact size. These monoblock lasers are used in the area of range finding and surveying applications, and have been used in commercial and military applications. For example, U.S. Pat. Nos. 6,556,614, 6,373,865 and 6,744,801 to Nettleton show monolithic and pseudo-monolithic laser resonators on a substrate.

Monoblock laser resonators have a set of gain rods, generally a Q-switch and an OPO with various mirrors arranged linearly along the length of a substrate. (Monoblock lasers, as defined herein, have at least one optical resonator subassembly which is constructed by permanently and immovably affixing the individual optical components to a common substrate, usually by adhesive bonding, so that the subassembly is a unified, optically aligned, non-adjustable single article of manufacture.) Light from flash lamps or from diode lasers is coupled into a rod of lasing material such as Nd:YAG or the like, and the light moves bidirectionally through the rod, bouncing between a highly reflective (HR) mirror and an output coupler (OC) mirror placed at either end of the lasing rod. In range finding applications there generally is a Q-switch to provide a pulsed output. In many applications an eye-safe (near infrared wavelength (e.g., 1.54 micron)) laser output is desirable. To that end, an optical parametric oscillator (OPO) is introduced into the optical path, to change the output wavelength from 1.1 micron, the output wavelength of the commonly used Nd:YAG lasing material, to a desired eye-safe wavelength such as 1.54 micron.

Existing monoblock lasers use a UV sensitive adhesive to set the optical elements in place along an optical axis. The adhesive is placed between the optical elements and the substrate and the optical elements are located in appropriate locations on the substrate. Certain of the optical elements may be affixed to the substrate in a pre-alignment setting step. A light source is coupled to the resonator and while the monoblock laser operates, an intensity or a divergence of the output light is monitored. Certain critical elements, such as the HR mirror or the OC, are tilted in pitch and/or yaw, until the intensity or divergence meets a pre-set specification. Once the specification is met, UV light is applied to those optical elements not already fixed in place. Some designs feature optical elements with a rectangular cross section, placed on a flat substrate and other designs have optical elements with a round cross section, designed for a concave substrate. Regardless of the shape of the cross section of the optical elements, the movement necessary to the alignment process created unavoidably tapered glue joints between the elements and the substrate. The adhesive shrinks volumetrically during the curing process, so that thicker adhesive layers shrink more than areas where the adhesive is thinner. Uneven adhesive shrinkage pulls the optical elements out of their alignment with respect to the common optical axis depending on the geometry of the elements and the differences in thicknesses of the adhesive layer. For example, in an undesirable tapered glue joint between a mirror and the substrate (both with rectangular cross section), the thicker end of the glue contracts more than the thinner end, and the difference in shrinkage tilts a previously-aligned mirror out of alignment. This problem invariably degrades laser performance or causes outright failure, reducing manufacturing yield by increasing required rework.

Non-monoblock lasers address mirror misalignment with adjustable mechanical optic mounts which permit tipping the mirrors in pitch and/or yaw, or alternatively with mechanical mounts which permit rotational adjustment of one or more alignable Risley wedge pairs. (Risley wedge pairs permit changing the direction of light passing through the Risley wedge pair by rotating one wedge of the pair against the other.) The mechanical mounts may be equipped with locking means (e.g., clamps, screws and the like) to secure the mechanical alignments, once alignment is achieved. Mechanical mounts generally add cost, size and weight to the non-monoblock laser and consist of several moving parts which introduce additional possibilities for subsequent misalignment.

Both problems degrade laser performance and reduce manufacturing yields by increasing re-work and failures, as well as requiring more power to operate a less than optimally aligned laser.

Consequently, a need exists for a more efficiently manufacturable laser, especially a monoblock laser, which substantially reduces misalignment of optical elements due to adhesive shrinkage.

SUMMARY OF THE INVENTION

The present invention has a substrate aligned along an axis and a first supporting means. A highly reflective (HR) mirror is disposed along the optical axis for reflecting light, and an output coupler (OC) mirror is also disposed along the optical axis, for reflecting light and passing a remainder of the light therethrough. A gain element means is disposed between the OC mirror and the HR mirror. A first adjustable element is disposed along the axis, supported by the supporting means and adapted to rotate with respect to the axis until an optimal rotation is reached. The light reflected from the HR mirror passes through the gain element means and partially through the OC mirror to provide a laser output. The adjustable element is fixed in rotation once a threshold in the laser output is reached. The HR mirror, the OC mirror, and any elements between (in this case, the gain element and the first adjustable element), form a first resonant cavity.

In a first aspect of the invention, the first supporting means comprises a recess shaped into the substrate. The recess has a first radius. Either the HR mirror or the OC mirror is disposed on the first adjustable element. The first adjustable element has a spherically shaped bottom with a radius of substantially the first radius and rotates in a pitch and a yaw direction with respect to the axis. This first aspect of the present invention applies to all types of monoblock lasers.

In another aspect of the present invention which applies to all types of laser resonators, the first adjustable element is a first Risley wedge pair. The first Risley wedge pair has a Risley axis therethrough, and the first supporting means fixes the Risley axis parallel to the axis. Preferably, the first supporting means is a V-block, preferably with two angled inner sides. The V-block preferably fits into a first trench in the substrate. In another embodiment, the first supporting means is a first concave recess formed in the substrate, where the HR mirror and the first Risley wedge pair are disposed in the first concave recess.

When a laser output at a second wavelength is desired (e.g., a two stage resonator), the substrate has a second supporting means and the light reflected off the HR mirror is light at a first wavelength. A wavelength shifting means is disposed between the gain element means and the OC mirror and shifts the light at the first wavelength to light at a second wavelength. The wavelength shifting means also passes the light at the first wavelength and may reflect light at the second wavelength, depending on the application. For example, an intracavity harmonic generator does not require light reflection. A second adjustable element is disposed along the axis and is adapted to rotate with respect to the axis until a second optimal rotation thereof is reached. The second adjustable element is supported by the second supporting means and the second adjustable element is fixed in rotation at the threshold. The two aforementioned aspects of the present invention, the Risley wedge pair and the matched recess and optic with a spherical bottom, are equally applicable to two stage resonator assemblies as well as any number of other configurations.

BRIEF DESCRIPTION OF THE DRAWINGS

Other objects and features of the present invention will become apparent from the detailed description when read in light of the attached drawings. It is understood that the drawings are for illustration only and are not intended to define the limits of the present aspects of the invention.

FIG. 1b shows an elevated perspective view of the V-block and the Risley wedge pair shown in FIG. 1a;

FIG. 3b is an elevated perspective view of a laser resonator with an external OPO, with Risley wedge pairs in grooves in the substrate shown in FIG. 3a;

FIG. 4c is a side view of an internal OPO embodiment using the matching spherical radii shown in FIG. 4a; and FIG. 4d is a side view of an alternative internal OPO embodiment using the matching spherical radii shown in FIG. 4a.

Reference designators of the same number refer to previously described components of that reference number.

DETAILED DESCRIPTION OF ILLUSTRATIVE EMBODIMENTS

Figure 1A:
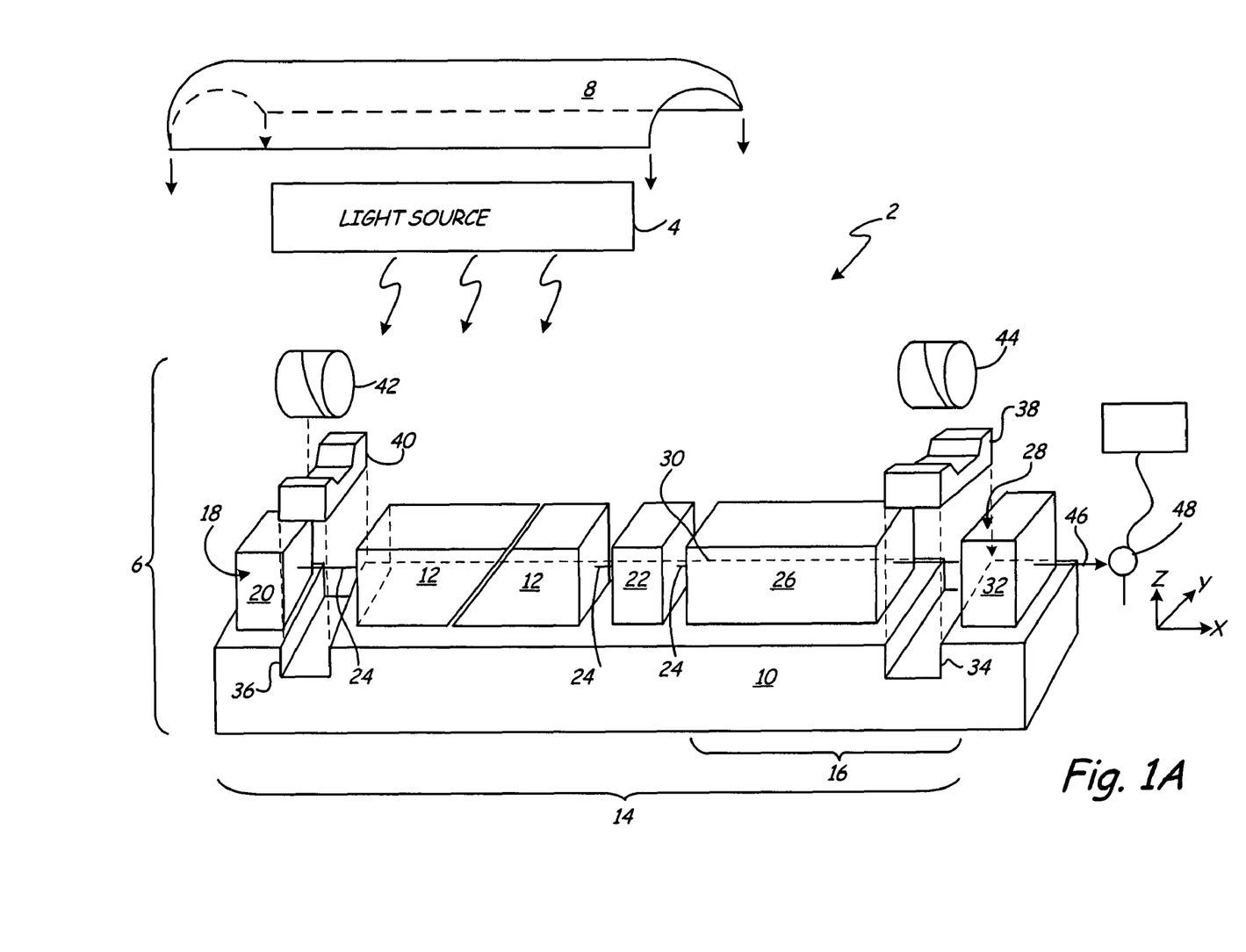
FIG. 1a is an exploded, elevated perspective view of an aspect of the present invention with Risley wedge pairs in V-blocks, with an internal OPO configuration.

FIG. 1 shows a monoblock laser of the present invention generally at 2, which includes a light source 4 coupling light into a resonator 6. Source 4 can be a set of laser diodes (lasing, for example, into the Nd:YAG material absorption bands near 808 nm), a single more powerful laser diode or, in a preferred embodiment, a flash lamp providing light at wavelengths 720-840 nm. Flashlamps are preferred in low repetition rate applications, while diodes permit operation at higher repetition rates as they generate less excess heat. A metal or ceramic reflector 8 is disposed above and around laser assembly 2 so as to reflect light back into laser 2 for higher efficiency operation.

Substrate 10 is made of undoped Yttrium Aluminum Garnet (YAG), which is chosen because its temperature coefficient of expansion matches closely with the temperature coefficient of a pair of Brewster gain blocks 12. Mismatched temperature coefficients lead to undesirable stress on the glue joint, potentially causing glue joint failure. Other substrate materials may also be used depending on the application. For example, other suitable substrate materials which are metallic (e.g., copper-tunsten alloy) or dielectric (e.g., aluminum nitride ceramic) may be used. Substrate thickness can be varied, but a preferred dimension is 3.5×3.5×67 mm long. Other substrate sizes work as well, for example 4.75×4.75 mm by various lengths. The length of substrate 10 is only one of several design variables and is adjusted to balance operational specifications for the laser. For example, a low divergence laser has its intermediate HR/HT mirror and the output coupler further apart (and therefore, a longer substrate) than a wider divergence, compact, short laser. Frequently, substrate 10 is 0.5 mm wider than the width of rods 12, which allow for simplified placement and alignment of those components without "overhanging" the substrate. Overhanging optics are likely to suffer mechanical damage, especially non-linear dielectric rods such as an OPO as they vary lot-to-lot in optical axis orientation.

Gain rod 12 is made of YAG crystal doped with Neodymium (Nd:YAG) in the range 0.7% to 1.1%. Other materials such as Nd:YLF or any other solid state laser medium which can be pumped by a flashlamp or diodes are suitable, and may be preferred for generating wavelengths other than 1.06 microns. The ends of gain blocks 12 are polished to eliminate scattering losses and coated to reduce Fresnel reflection losses. Pump light from light source 4 is absorbed by gain blocks 12. Nd:YAG is the material of choice as its physical properties (e.g., optical, spectroscopic, mechanical, thermal and electrical) are ideally suited to the manufacture of a rugged, efficient solid state laser gain medium. A preferred supplier of Nd:YAG is Scientific Materials Corp. of Bozeman, Mont. The cross sectional profile of the optical components in laser 2 is square to allow for easy manufacture, but other cross sections such as circular, triangular and other shapes work as well. A preferred cross sectional size of gain rods 12 is 3 mm×3 mm, but ultimately gain rod volume is set by power output specifications.

A polished-end angled cut is made through gain rod 12 at the Brewster angle of the light traveling in the first resonant cavity, 1.06 micron. The angled Brewster angle cut linearly polarizes light in first resonant cavity 14, which is necessary for later wavelength shifting in a second resonant cavity 16. The axial location of the angled cut is unimportant. It is well understood that the Nd:YAG with an angled Brewster cut chosen for this preferred embodiment functionally provides both gain and polarization. The gain function is required for making the most basic of lasers, but the polarization function is additionally required when later frequency shifting is desired. Therefore, alternative embodiments of gain medium 12 are uncut gain material with polarization achieved with a separate polarizing optic. One example of a separate polarizer is a thin-film cube polarizer or the like. Another way to achieve the polarization and the gain functions include the use of a polarizing gain medium such as Nd:YLF, which material is inherently polarizing without a Brewster angle cut through the crystal.

A highly reflective (HR) mirror 18 is deposited on a separate optic 20, to reflect light back into the pair of gain rods 12. Separate optic 20 is fabricated from glass, YAG or other optically transparent material, as appropriate. Optic 20 is approximately 4 mm long, in order to provide adequate surface area for bonding to substrate 10. A passive Q-switch 22, which preferably is a $Cr^{4+}$ doped YAG crystal, is also supported by substrate 10 and disposed with its cross section perpendicular to a primary axis 24. Q-switch 22 is preferably located between gain blocks 12 and an OPO crystal 26, but may be located anywhere between HR mirror 18 and an output coupler (OC) 28. Q-switch 22 attenuates light up to a critical energy level then quickly switches to a highly transmissive state, causing the laser to emit a short, high intensity output pulse desirable for specifications found in military laser range finders. Alternatively, Q-switch 22 may be made of another passive material or be an active Q-switch operating according to electro-optic or acousto-optic principles. A dichroic mirror 30 is vacuum deposited on a cross section of Q-switch 22, and is an HR/HT mirror with high reflection at 1.54 microns and high transmission at 1.06 microns.

Light at 1.06 micron which passes through dichroic mirror 30 enters optical parametric oscillator (OPO) crystal 26. OPO 26 is a non-linear dielectric material oriented for non-critical phase matching, preferably made of KTA (Potassium Titanyl Arsenate) or the like, which converts light at the first wavelength to light at a second eye-safe wavelength of 1.54 micron. Other types of crystals, such as KTP (Potassium Titanyl Phosphate) may be used, depending on the desired second stage wavelength. Nonlinear crystals cut at different angles for critical phase matching can also be used to generate other wavelengths. In general, any optical material which has a non-linear dielectric polarizability is a candidate for use as an OPO. Output coupler (OC) mirror 28 is vacuum deposited on a separate optic 32, and passes a portion of the light at 1.54 microns as a final output of laser assembly 2 and reflects light at 1.06 microns back into first resonant cavity 14. When the wavelength shifting crystal 26 does not require reflection of the light at the second wavelength (e.g., if it were an intra cavity harmonic generator), the reflective properties of dichroic mirror 30 are unnecessary. Second resonant cavity 16 is formed of dichroic mirror 30, OPO crystal 26 and output coupler 28, in which the remainder of the light at 1.54 micron reflects between mirror 30 and OC 28 and through crystal 26.

Figure 1B:
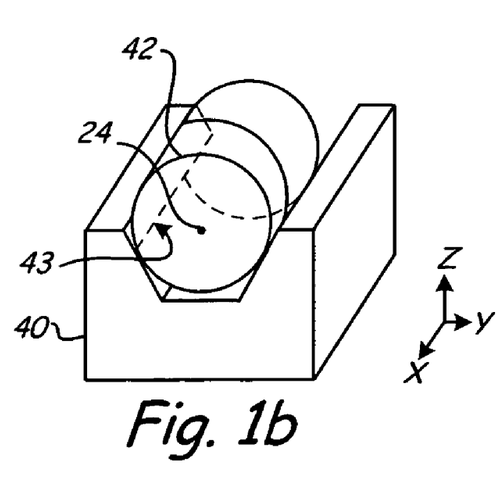

According to the present invention, a pair of rectangular trenches 34,36 are machined into substrate 10. A pair of V-blocks 38,40 are machined of the same material as substrate 10 to fit into trenches 34,36 and are preferably affixed with an adhesive. Each Risley wedge pair 42,44 comprises two optical wedges having equal wedge angles which are twisted against each other to adjust the direction of light passing through the pair. Each Risley wedge pair 42,44 is preferably positioned closely adjacent to optics 20,32, respectively. V-blocks 38,40 hold Risley wedge pairs 42,44, respectively. In FIG. 1b, V-block 40 contacts Risley wedge pair 42 in two lines of contact (one hidden line shown at 43). Preferably, the bottom of Risley wedge pair 42 does not rest on V-block 40. The V-block support fixes the rotational axis of a Risley wedge pair substantially parallel to primary axis 24, permitting the Risley wedge pair to be adjusted exclusively in rotation (and not in pitch nor yaw) while the laser output is monitored, and an optimal rotational position of the Risley wedge pair fixed when the laser output (e.g., divergence, intensity) reaches a pre-set threshold. (Pitch is angular movement with respect to the x axis in the x-z plane; yaw is angular movement with respect to the x axis in the x-y plane (see orthogonal axes in FIG. 1a.) In essence, this aspect of the present invention employs a bondable optic which does not require tipping for alignment as the tipping leads to an unavoidably tapered glue joint.

This aspect of the present invention can be embodied in any monoblock laser which supports a Risley wedge pair so that only rotational movement with respect to the optical axis can occur. For example, a support with a different geometry on its inner sides (e.g., irregular curved or jagged) may not form two continuous straight lines of support between itself and the Risley wedge pair, but the sides of the support will maintain alignment of the Risley wedge pair. This arrangement prevents an aligned Risley wedge from becoming misaligned due to volumetric glue shrinkage. In practice, the glue is placed in the space between the Risley wedge pair and the V-block and cured. The tendency of the glue to shrink is resisted by the physical lines of contact between the Risley wedges and the V-block. This creates strong tensile forces within the cured glue which serve to hold the Risley wedges firmly in the V-blocks. Thus, it is the V-block/Risley geometry that determines the position of the Risley wedge pair, not the glue; the glue serves only to affix the Risley wedge pair to the V-block.

Figure 1C:
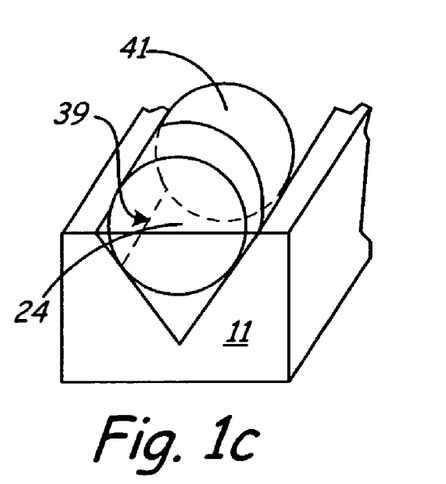
FIG. 1c shows an elevated perspective view of an alternative embodiment of a substrate and a Risley wedge pair.

It is also understood that other monoblock laser designs may employ different numbers of Risley wedge pairs. The general rule is that for each n mirrors, n−1 Risley wedge pairs are required to align the laser. It is also understood that the substrate may be machined to itself provide the necessary contact support between the Risley wedge pair and the substrate, rather than an additional V-block piece. For example, FIG. 1c shows a substrate 11 which is formed with an integral V-groove supporting a Risley wedge pair 41. Hidden line 39 forms one of the two lines of support. The rest of substrate 11 is preferably otherwise flat to conform to rectangular optical components, but this aspect of the present invention applies equally well to a monoblock laser with all optical components having a common cross sectional shape.

Figure 2:
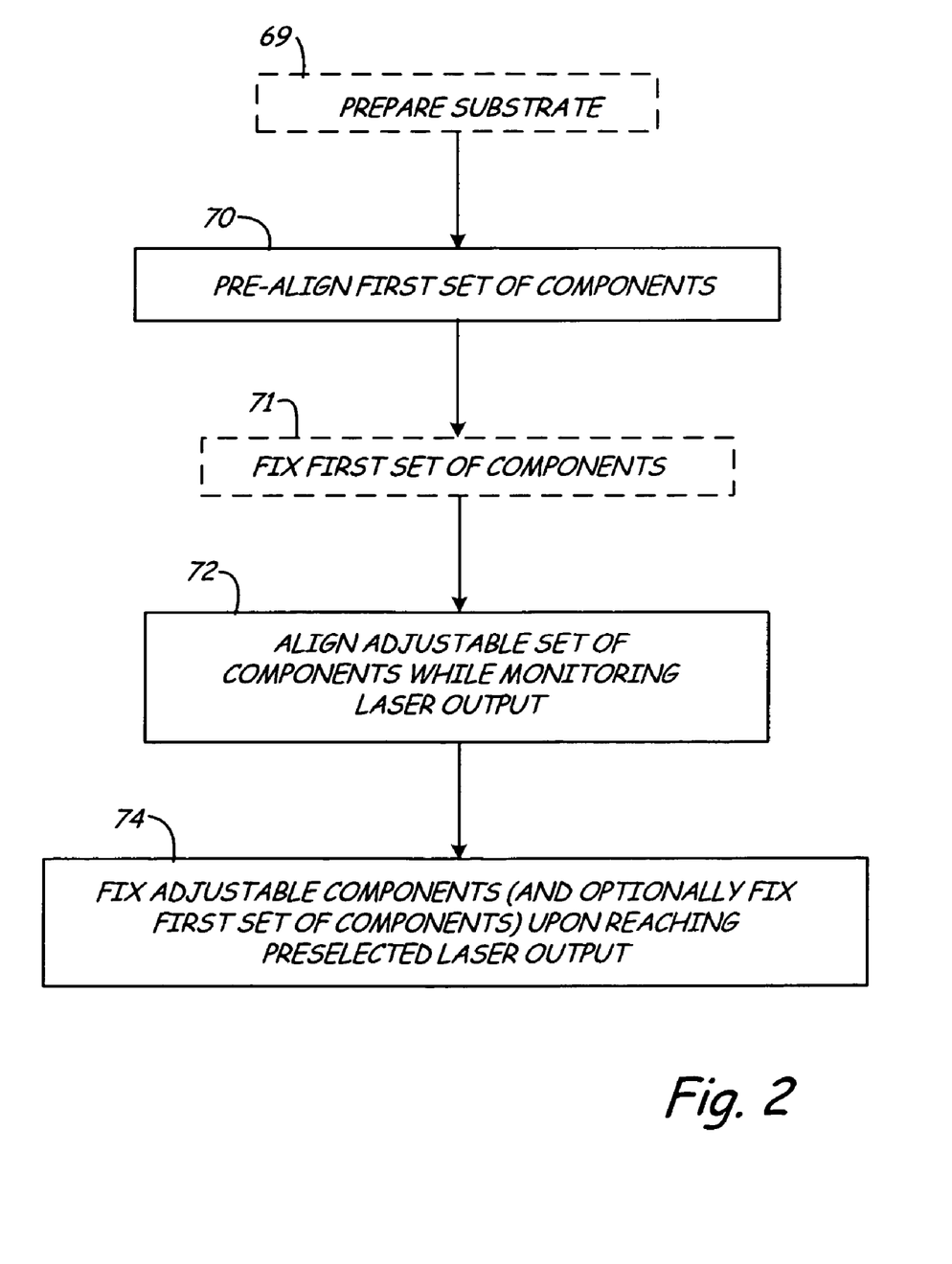
FIG. 2 is a block diagram of a method of assembly, applicable to both aspects of the present invention.

FIG. 2 shows an optional step 69 of preparing the substrate, which for the embodiment shown in FIG. 1a, includes gluing non-integral V-block means into the substrate. Next, a pre-alignment step in block 70 occurs, where optic 20 (with mirror 18), gain rods 12, Q-switch 22, OPO crystal 26 (with dichroic mirror 30) and optics 32 (with OC mirror 28) are fixed in place on substrate 10 along optical axis 24, using a thin, uniform layer of a UV sensitive adhesive such as Norland 61 or the like. A single drop of Norland 61 is adequate for adhesion and at this time, UV light preferably fixes the position of the aforementioned components (see optional step 71). The thin, uniform nature of the adhesive serves to limit tilt of the components during curing of the adhesive, since adhesives shrink volumetrically during curing. Other adhesive means, including adhesives sensitive to heat or which cure on exposure to air, or diffusion bonding may also be used. In any event, manufacturer's instructions may include temperature cycling to cure and stabilize the adhesive, as required. In block 72, light source 4 is energized and a lased light output 46 is monitored in electronics/optics block 48 for some desired physical parameter such as divergence and/or light intensity (as required by the application). While laser assembly 2 operates, circular Risley wedge pairs 42,44 are adjusted to optimize the desired physical parameter. In block 74, once the energy monitoring system in electronics/optics block 48 registers a pre-set threshold for the divergence and/or light intensity, the adjustable Risley wedge pairs 42,44 are fixed in place (including all other components if not already fixed in place) by shining UV light on the adhesive.

The present invention as shown in FIG. 1a is an internal OPO design, as second resonant cavity 16 is contained within first resonant cavity 14. It will be understood by workers skilled in the art that this aspect of the present invention applies equally well to a simple one-stage laser (one without dichroic mirror 30 and OPO 26, with or without Q-switch 22). Accordingly, minor modifications can be made to the present invention, such as modifying the position of mirrors onto a separate optic without limitation; disposing dichroic mirror 30 on an end of Q-switch 22, or using an alternatively shaped substrate (such as a rectangular or V-shaped substrate), without departing from the spirit and scope of the invention.

Figure 3A:
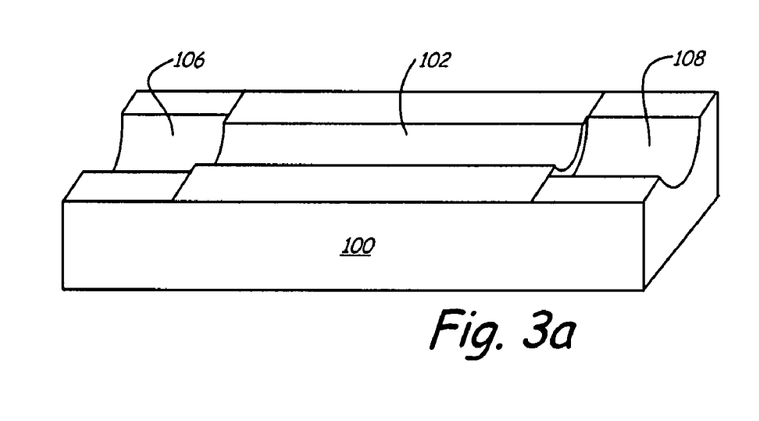
FIG. 3a is an elevated perspective view of a substrate for use in the Risley wedge pair aspect of the present invention.
Figure 3B:
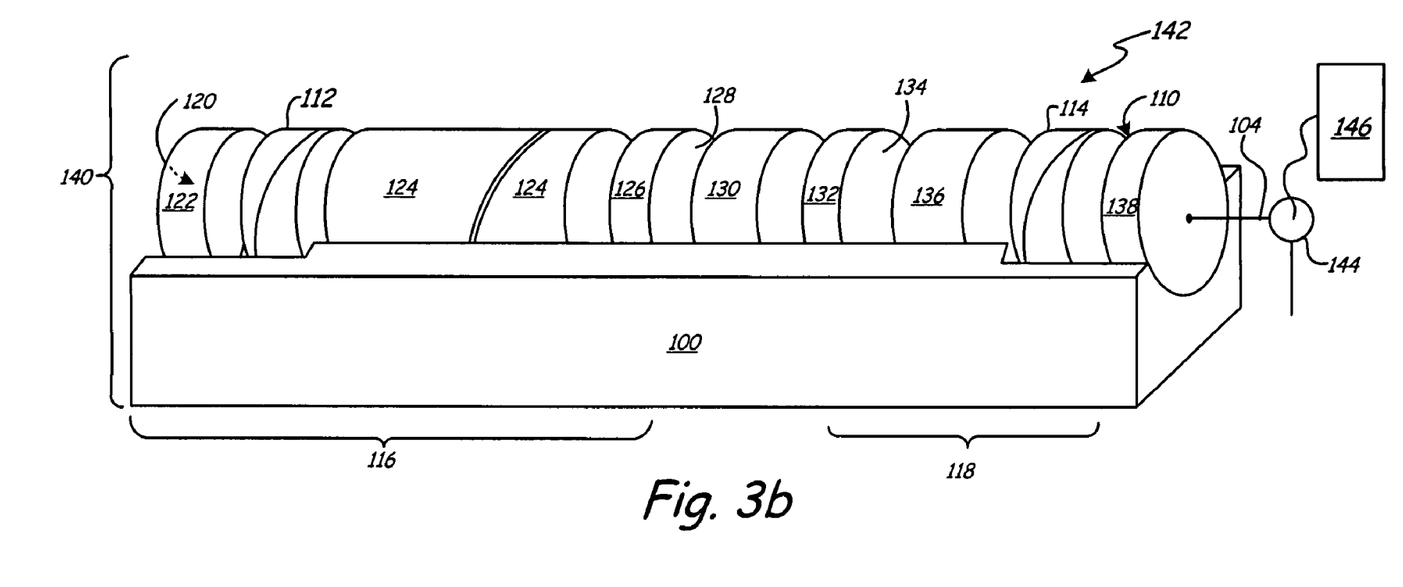

FIGS. 3a and 3b show an external OPO version of this aspect of the present invention, according to a concave substrate embodiment used with integral detents for two Risley wedge pairs. A substrate 100 fabricated of YAG, has a central core 102 for supporting a number of optical elements along an optical axis 104. Two detents 106,108 on each end of substrate 100 have larger radii than central core 102. First detent 106 supports HR mirror 120 and an adjustable Risley wedge pair 112, and second detent 108 supports output coupler mirror 110 and an adjustable Risley wedge pair 114. The inner edge of circular grooves 106,108 fix where Risley wedge pairs 112,114 are located. In this embodiment, the substrate has an edge against which the Risley wedge pair is restrained. The radii of sections 106, 108 are slightly less than the radii of Risley wedge pairs 112,114, so that the intersection of the planar and curved sections fully support each Risley wedge pair and preferably, the Risley wedge pairs do not rest on the bottom of the curved sections.

A first resonant cavity 116 includes HR mirror 120 deposited on an end of a separate optic 122, Risley wedge pair 112, a pair of angled Brewster cut gain rods 124 which produce and polarize light at a first wavelength and Q-switch 126 with an intermediate mirror 128 deposited thereon. Intermediate mirror 128 partially passes light at the first wavelength onto optional mode-matching optics 130 and reflects the rest of that light. Mode matching optics 130 are employed as needed according to the application, to ensure that adequate energy and a low enough divergent beam are present in second resonant cavity 118. An alternate embodiment for optics 130 is an appropriately oriented and spaced Galilean telescope. A separate mirror block 132 is disposed next in the optical path of resonator 140, with a dichroic mirror 134 deposited on it. HR/HT mirror 134 passes light at the first wavelength, (1.06 micron) and reflects light at the second wavelength (1.54 micron) back into cavity 118. Nonlinear crystal 136 follows next along the optical axis 104, and another separate mirror optic 138 with an integrated OC mirror 110 on its cross section is disposed on the end of substrate 100. Second resonant cavity 118 is formed by HR/HT mirror 134, nonlinear optic 136, Risley wedge pair 114 and OC mirror 110. Light from first resonant cavity 116 enters nonlinear dielectric 136, which converts light at the first wavelength to light at the second wavelength. OC mirror 110 substantially passes a portion of the light at the second wavelength as an output of laser assembly 142 (shown in FIGS. 3a and 3b without a light source and a reflector), and reflects the remainder of the light back into dielectric 136. The same comments made above with respect to FIGS. 1a-c, as to preferred materials and their alternatives, apply in this external OPO embodiment.

To manufacture the concave substrate embodiment of the present invention, the steps of FIG. 2 apply. In step 70, the components located in central core 102 (gain rods 124, Q-switch 126, optional matching optics 130, separate optic 132 with HR/HT 134 thereon and OPO 136) and the ends 106,108 (separate optics 122,138) are coated with a thin, uniform layer of adhesive and placed into cores 102,106,108. Preferably, UV light is now directed onto the adhesive (see optional step 71), but it may be done in a single step after Risley wedge pairs 112,114 are adjusted. In step 72, adjustable Risley wedge pairs 112,114 are placed against the detent formed by the edge of core 102. A light source (not shown) is energized and laser resonator 140 emits a laser output at 1.54 microns at 104. The light output at 104 is detected by sensor 144 and electronic system 146 which provides a light intensity and/or divergence of output 104, as appropriate for the application. Adjustable Risley wedge pairs 112,114 are rotationally adjusted in place while the output from electronics/ optics block 146 is monitored. In step 74, once electronics/ optics block 146 registers a pre-set threshold for the divergence and/or light intensity, adjustable Risley wedge pairs 112,114 are fixed in place by shining UV light on the adhesive (or optionally, all components are fixed in place at this time).

Figure 4A:
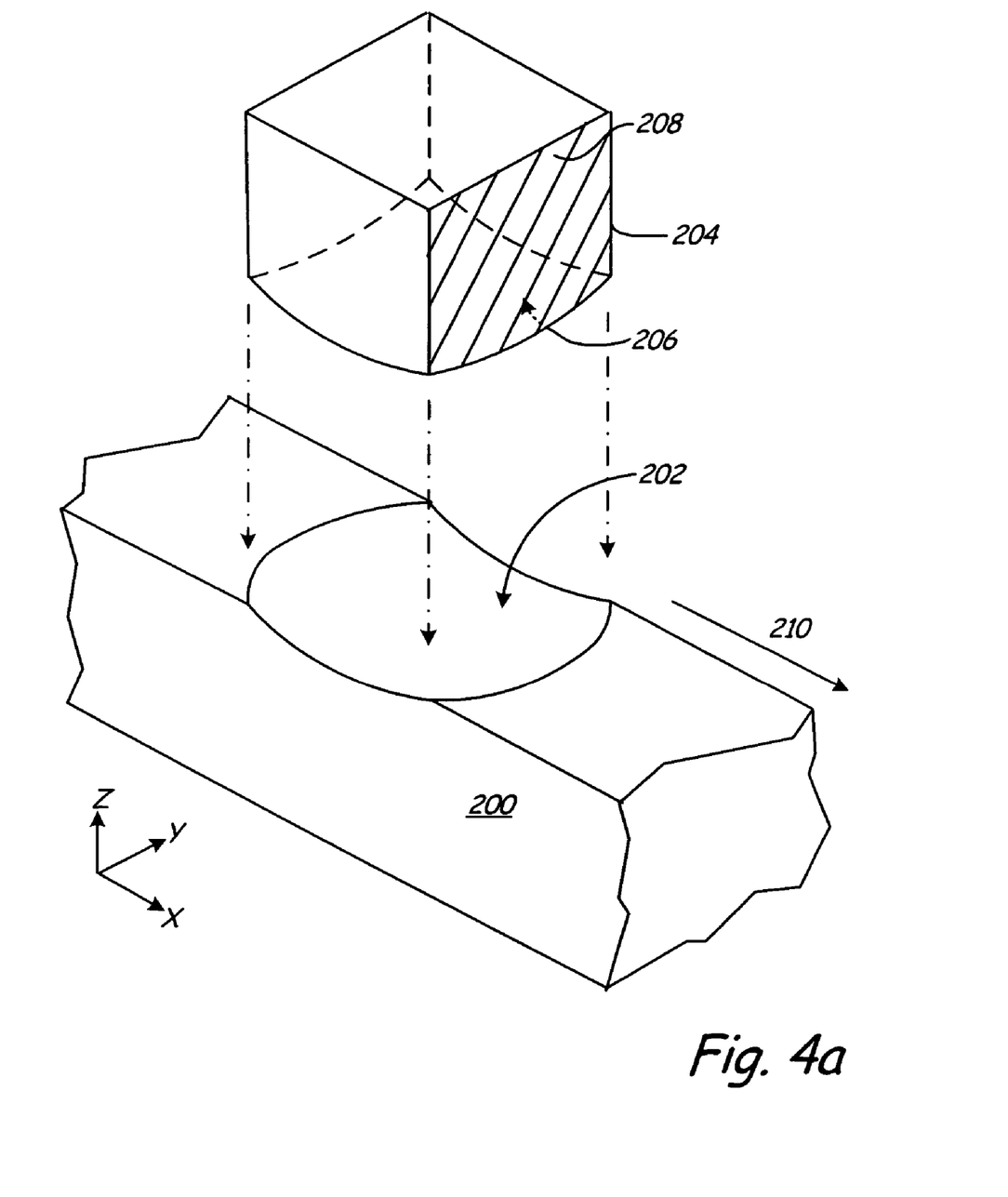
FIG. 4a is an elevated perspective view of a substrate and spherical bottom optical element for use in the matching spherical radii aspect of the present invention.

FIGS. 4a-d show the second aspect of the present invention, where substantially matching radii of a novel optic and substrate eliminate undesirable tipping during alignment. FIG. 4a shows a cutaway substrate 200 with a spherical dimple or recess 202 machined on its otherwise flat surface. A separate optic 204 has all sides flat except for its bottom 206, which is spherically shaped with substantially the same radius as spherical dimple 202. Any cross section taken across bottom 206 through its center will have the same radius of curvature. Machine tools equipped with specially shaped, diamond-grit-embedded cutters are preferably used to create dimple 202 and bottom 206. An optimal radius of curvature for elements with a 3 mm square cross section is approximately 10 mm, but a larger radius of curvature, such as 12 mm, works for elements with a square cross section of 4.25 mm. Optic 204 has a mirror 208 on one of its cross sections perpendicular to an optical axis 210.

Figure 4B:
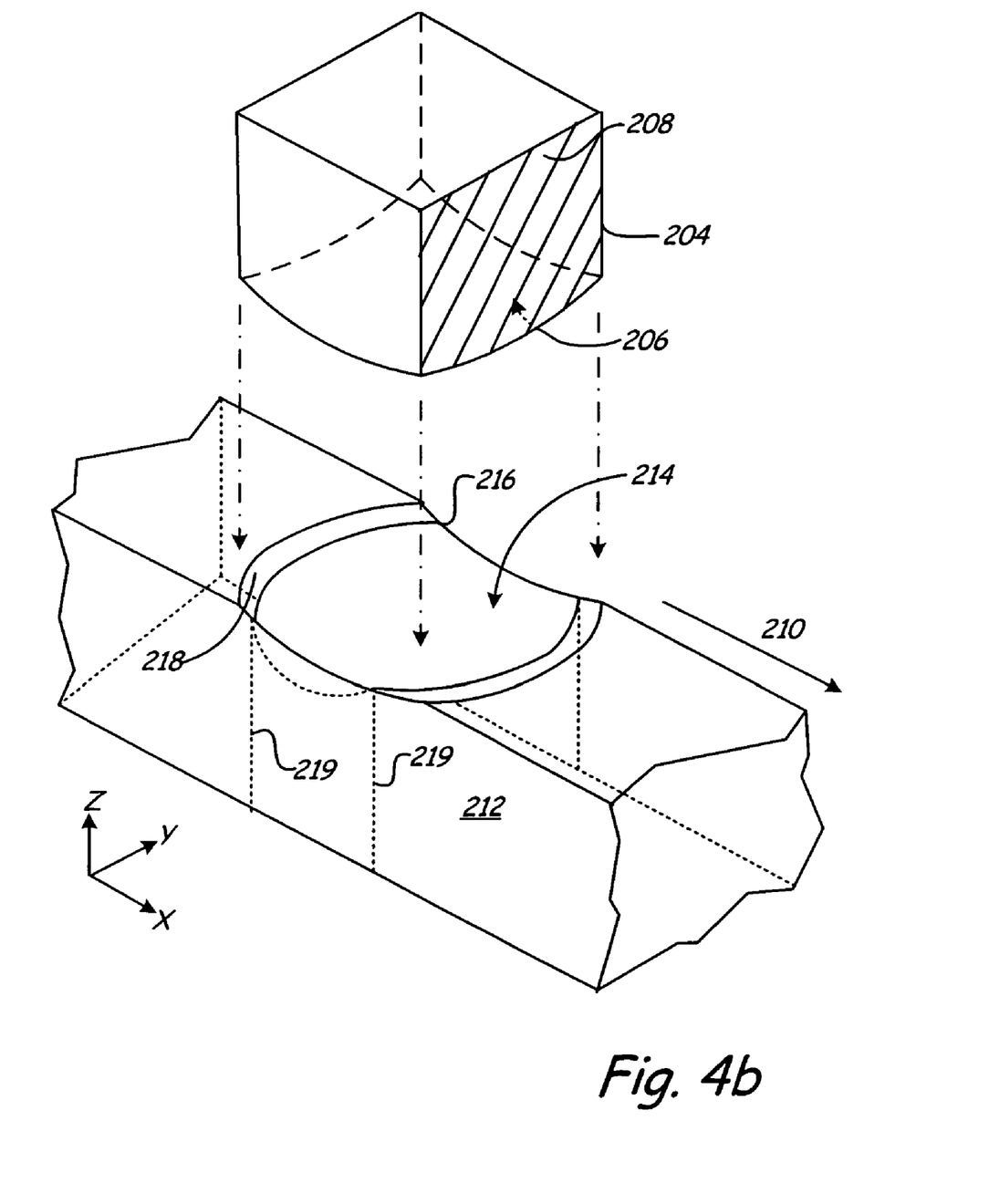
FIG. 4b is an elevated perspective view of an alternative substrate and spherical bottom optical element for use in the matching spherical radii aspect of the present invention.

FIG. 4b shows an alternative substrate 212 for use with a spherical bottom optic 204. A spherically shaped recess is machined in substrate 212, and the same spherical shaped recess as in FIG. 4a continues until contour 216 in FIG. 4b. A narrow rim 218 is formed between the surface of substrate 212 and contour 216 which supports optic 204. Another spherically shaped recess 214 having a smaller radius than the one which forms rim 218 is machined into substrate 212, which permits excess glue to accumulate therein during alignment. Alternatively, small recess 214 extends down through substrate 212 to form a hole 219 through the substrate. Regardless of the embodiment of the substrate, manufacture continues as described below.

During manufacture, a first set of optics (not the ones with a spherical bottom) are preferably glued to the substrate. Next, a thin, uniform layer of an adhesive is applied to one of the surfaces 202,206, and optic 204 is placed into dimple 202 (or alternatively onto rim 218). If not already glued, the other elements forming the resonator are glued onto the substrate (step 71). The laser is energized, and the divergence and/or intensity of the light output by the laser is monitored while optic 204 is moved in pitch and/or yaw (step 72). At a pre-set threshold representing a desired divergence and/or intensity, optimal alignment of optic 204 is achieved and appropriate means are used to fix optic 204 in place, such as an UV sensitive adhesive (step 74).

The purpose of the matching spherical radii (on a substrate and a separate optic with a mirror) is to permit alignment of the mirror without creating a tapered adhesive joint. In essence, the interface between the optic and the substrate is optimally shaped so the glue layer maintains a constant thickness as the optic is tipped in pitch and/or yaw.

The adhesive layer and the spherical geometry of the joint maintain a constant thickness of adhesive as the optic (which has the mirror disposed thereon) is tilted in alignment. Tapered adhesive joints pull previously aligned optics out of alignment because the adhesive shrinks volumetrically. For example, on a glue joint tapered across the length of a substrate, the thicker side of the joint shrinks more than does the thinner side.

The present invention of the substantially matching radii (a substrate dimple or recess and an optic with a spherical bottom) is applicable, without limitation, to all monoblock lasers. It is also understood that this aspect of the present invention includes the use a spherical dimple in an optic and a substrate with a spherical protrusion on it Further, while the number of adjustable elements (e.g., substantially matching radii optics and substrate dimples or recesses) in this embodiment of the present invention is two, it is understood that in general, a laser design with n mirrors requires n−1 adjustable elements to align it. Accordingly, other monoblock laser designs with more or fewer mirrors will have correspondingly different numbers of adjustable elements. In any event, the location and function of substantially matching radii optic and substrate are determined by application.

Figure 4C:
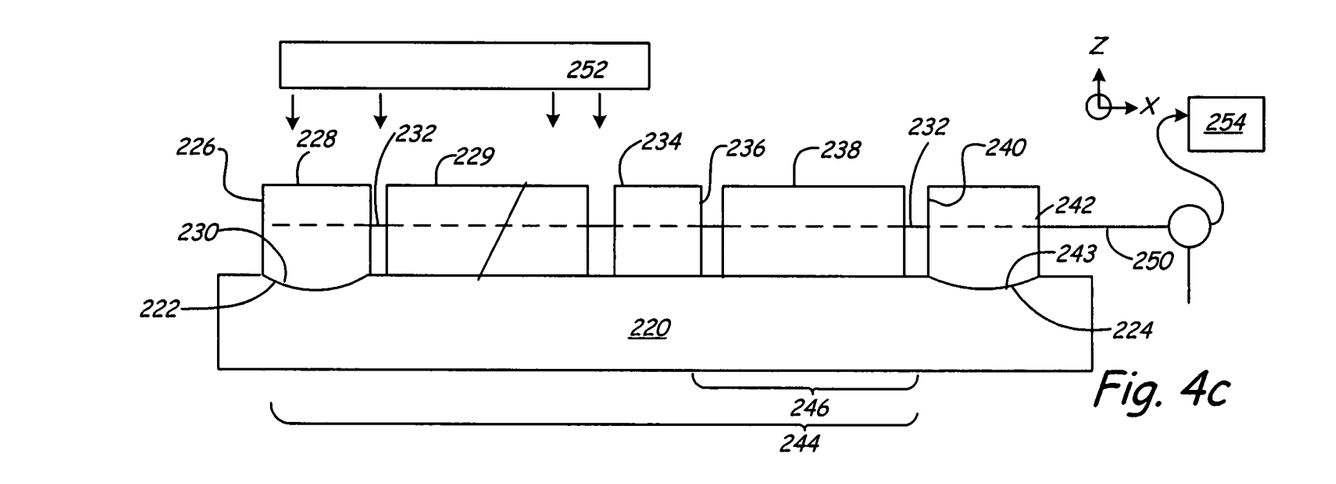

FIG. 4c shows a side view of a monoblock laser with a pair of substantially matching radii optics and substrate dimples, according to the present invention. A substrate 220 has two dimples 222,224 machined therein. An HR mirror 226 is disposed on a separate optic 228. Optic 228 has a spherical bottom 230, which has substantially the same radius of curvature as dimple 222. A pair of YAG gain rods 229 with a Brewster angle cut is disposed next along an optical axis 232, followed by a passive $Cr^{4+}$ doped YAG crystal Q-switch 234. On a cross-section of Q-switch 234, a HR/HT mirror 236 is disposed perpendicular to axis 232. HR/HT mirror 236 passes light at a first wavelength (preferably 1.06 microns) and reflects light at a second wavelength; (preferably 1.54 microns). An OPO 238 is disposed next along axis 232, and an OC mirror 240 is deposited on a side of separate optic 242. Separate optic 242 has a spherical bottom 243 matched in radius to that of the substrate dimple 224. OC mirror 240 passes a portion of light at the second wavelength as the laser output, 250, and reflects light at the first wavelength. A first resonant cavity 244 is formed by HR mirror 226, gain rods 229, Q-switch 234, OPO 238 and OC 240. A second resonant cavity 246 is formed by dichroic mirror 236, OPO 238 and OC 240. Operation of this internal OPO configured monoblock laser is as described above with reference to FIG. 1a.

Manufacture of the matching spherical radii monoblock laser of FIG. 4a is described in FIG. 2. Gain rods 229, Q-switch 234 and OPO rod 238 are placed on substrate 220 with a thin, uniform layer of adhesive (e.g., Norland 61), shown in step 70 of FIG. 2. In step 72, adjustable components 228, 242 are also placed on substrate 220 with a thin, uniform layer of adhesive, and a light source 252 is energized to provide a laser output 250. Separate optic 228 (with HR mirror 226 disposed thereon) and separate optic 242 (with OC mirror 240 disposed thereon) are the adjustable components described in step 72, which are moved in pitch and/or yaw while laser output 250 is monitored by energy monitor system 254. Once a pre-set threshold of divergence and/or intensity of output 250 is reached, UV light is directed to whichever components are not fixed in place (step 74). In this embodiment, adjustable components 228,242 are fixed in place by shining UV light on the adhesive.

Figure 4D:
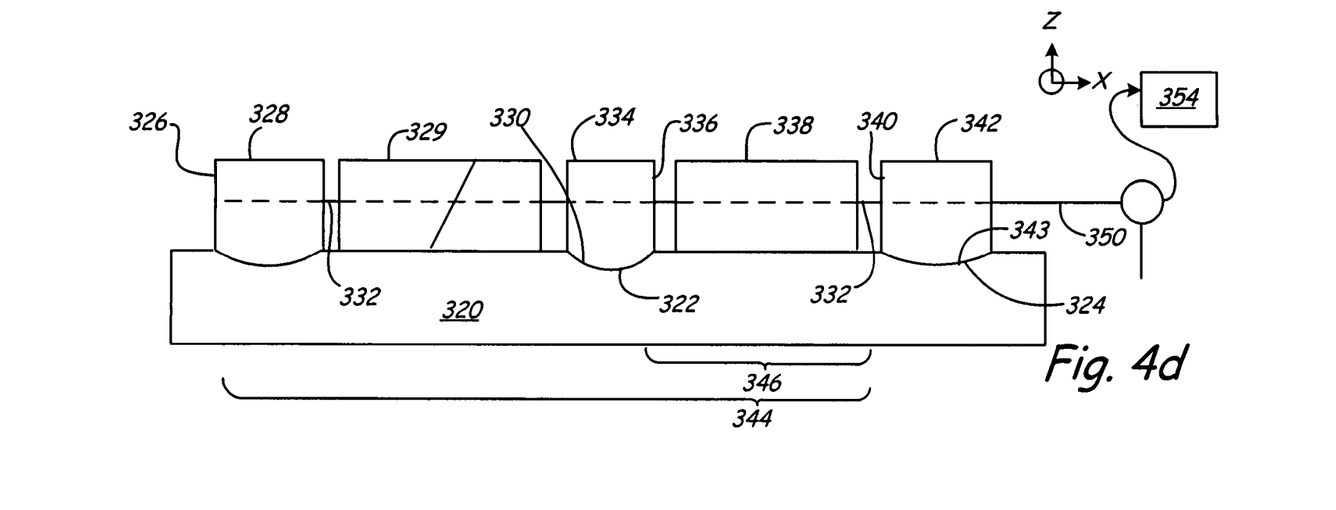

The optical function of each respective component in FIG. 4d is the same as that described in FIG. 4c. A substrate 320 has two dimples 322,324 machined therein. An HR mirror 326 is disposed on a separate optic 328. A pair of YAG gain rods 329 with a Brewster angle cut is disposed next along an optical axis 332, followed by a passive $Cr^{4+}$ doped YAG crystal Q-switch 334. On a cross-section of Q-switch 334, a HR/HT mirror 336 is disposed perpendicular to axis 332. Q-switch 334 has a spherical bottom 330, which has substantially the same radius of curvature as dimple 322. HR/HT mirror 336 passes light at a first wavelength (preferably 1.06 microns) and reflects light at a second wavelength (preferably 1.54 microns). An OPO 338 is disposed next along axis 332, and an OC mirror 340 is deposited on a side of separate optic 342. Separate optic 342 has a spherical bottom 343 matched in radius to that of substrate dimple 324. OC mirror 340 passes a portion of light at the second wavelength to form laser output 350, and reflects light at the first wavelength. A first resonant cavity 344 is formed by HR mirror 326, gain rods 329, spherical bottom Q-switch 334, OPO 338 and spherical bottom OC 340. A second resonant cavity 346 is formed by dichroic mirror 336, OPO 338 and OC 340. Operation of this internal OPO configured monoblock laser is as described above with reference to FIG. 1a.

Manufacture of the matching spherical radii monoblock laser of FIGS. 4c-d is described in FIG. 2. HR mirror 326, gain rods 329, and OPO rod 338 are placed on substrate 320 with a thin, uniform layer of adhesive (e.g., Norland 61), shown in step 70 of FIG. 2. In step 72, adjustable components 334, 342 are also placed on substrate 320 with a thin, uniform layer of adhesive, and a light source (not shown) is energized to provide a laser output 350. Q-switch 334 (with HR/HT mirror 336 disposed thereon) and separate optic 342 (with OC mirror 340 disposed thereon) are the adjustable components described in step 72, which are moved in pitch and/or yaw while laser output 350 is monitored by energy monitor system 354. Once a pre-set threshold of divergence and/or intensity of output 350 is reached, step 74 is performed in which adjustable components 334,342, and other components which are not yet fixed in place, are fixed in place by setting the adhesive.

This matching spherical radii aspect of the present invention includes at least one mirror as the adjustable element of the monoblock laser, but workers skilled in the art will understand that it applies to any type of monoblock laser design. Furthermore, although this aspect of the present invention has been described with reference to preferred embodiments, workers skilled in the art will recognize that changes may be made in form and detail without departing from the spirit and scope of the invention. For example, the second resonant cavity of FIG. 3b can readily be replaced by other means for generating second wavelengths, including but not limited to an optical parametric amplifier or a harmonic generation crystal cut and oriented for frequency multiplication. Furthermore, various combinations of optics having the same function as those described herein, such as those which vary in cross sectional shape and material, or those which have a modified order of placement but accomplish the same function as those laser resonators described herein, are understood to come within the present invention.

What is claimed is:

1. A monoblock laser apparatus, comprising:
    a substrate aligned along an axis and having a first recess therein, the substrate having a first support immovable with respect to the substrate, adapted to fit into the first recess, and having two inner sides to provide mechanical support;

an HR mirror immovably affixed to the substrate, for reflecting light;

an OC mirror immovably affixed to the substrate and disposed along the axis, for reflecting light and passing a remainder of the light therethrough;

a gain element adapted to amplify and polarize the light, the gain element immovably affixed to the substrate and disposed between the OC mirror and the HR mirror; and a first Risley wedge pair adapted to rotate about the axis until an optimal rotation position is reached, the first Risley wedge pair having a substantially circular cross section and substantially supported between the two inner sides of the first support, the first support positioned between the HR mirror and the OC mirror, wherein light reflected from the HR mirror passes through the first Risley wedge pair and the gain element and partially through the OC mirror to provide a laser output, wherein the first Risley wedge pair is fixed in the rotation position based on a desired threshold in the laser output.

2. The apparatus of claim 1 wherein the light reflected off the HR mirror comprises light at a first wavelength, the apparatus further comprising wavelength shifting means for changing the light at the first wavelength to light at a second wavelength, the wavelength shifting means passing the light at the first wavelength, the wavelength shifting means disposed between the gain element and the OC mirror along the axis.

3. The apparatus of claim 2 where the wavelength shifting means further comprises means for reflecting light at the second wavelength.

4. The apparatus of claim 2 further comprising:
a second support immovable with respect to the substrate and having two inner sides; and
a second Risley wedge pair adapted to rotate about the axis until a second optimal rotation position is reached, the second Risley wedge pair substantially supported between the two inner sides of the second support and positioned between the wavelength shifting means and the OC mirror, wherein the second Risley wedge pair is fixed in the rotation position based on the desired threshold in the laser output.

5. The apparatus of claim 4, wherein the first support is integral to the substrate, and wherein the substrate includes a second recess therein, with the second support adapted to fit into the second recess.

6. The apparatus of claim 1, wherein the substrate has a first and a second concave recess formed therein, the HR mirror disposed in the first concave recess and the gain element disposed in the second concave recess.

7. The apparatus of claim 6 wherein the first concave recess fully supports the HR mirror, and wherein the apparatus comprises:
a third recess formed in the substrate and having a third radius;
a Q-switch disposed along the axis between the HR mirror and the OC mirror, the Q-switch having a third surface shaped substantially to match the third radius of the third recess such that the Q-switch is rotatable in a pitch and a yaw direction with respect to the axis to align the Q-switch prior to being immovably affixed in the third recess.

8. The apparatus of claim 2 further comprising a Q-switch immovably affixed to the substrate and disposed along the axis between the HR mirror and the OC mirror.

9. An apparatus, comprising:
a substrate aligned along an axis and having at least a first recess and a second recess;
a first support disposed at least partially within the first recess, the first support immovable with respect to the substrate and having two inner sides;
an HR mirror immovably affixed to the substrate and disposed along the axis, for reflecting light, wherein the light reflected of the HR mirror comprises light at a first wavelength;
an OC mirror immovably affixed to the substrate and disposed along the axis, for reflecting light and passing a remainder of the light therethrough;
a gain element adapted to amplify and polarize the light, the gain element immovably affixed to the substrate and disposed between the OC mirror and the HR mirror;
a first adjustable element disposed along the axis and adapted to rotate with respect to the axis until a first optimal rotation position is reached, the first adjustable element having a substantially circular cross section and supported between the two inner sides of the first support, wherein light reflected from the HR mirror passes through the gain element and partially through the OC mirror to provide a laser output, wherein the first adjustable element is fixed at the first optimal rotation position based on a desired threshold in the laser output;
a wavelength shifting component adapted to change the light at the first wavelength to light at a second wavelength, the wavelength shifting component immovably affixed to the substrate and disposed between the gain element and the OC mirror along the axis, the wavelength shifting component adapted to pass the light at the first wavelength;
a second support disposed at least partially within the second recess of the substrate, the second support immovable with respect to the substrate and having two inner sides; and
a second adjustable element, having a substantially circular cross section and disposed along the axis, adapted to rotate with respect to the axis until a second optimal rotation position is reached, the second adjustable element supported between the two inner sides of the second support, wherein the second adjustable element is fixed at the second optimal rotation position based on the desired threshold in the laser output.

10. The apparatus of claim 9 wherein the substrate comprises a third recess shaped into the substrate, the third recess having a third radius, and wherein the HR mirror or the OC mirror is disposed in the third recess and has a spherically shaped bottom with substantially the third radius which allows rotation in a pitch and a yaw direction with respect to the axis prior to being immovably fixed.

11. The apparatus of claim 10 wherein the third recess has a rim therearound.

12. The apparatus of claim 11 where the substrate has a top, the top opposite the bottom, where the rim encircles a surface extending between the top and the bottom.

13. The apparatus of claim 10 where the rim encircles a depression in the substrate.

14. The apparatus of claim 10 where the HR mirror is disposed on a distal end of the first adjustable element so that the light passes therethrough.

15. The apparatus of claim 10 where the HR mirror is disposed on a proximal end of the first adjustable element.

16. The apparatus of claim 10 where the OC mirror is disposed on a distal end of the first adjustable element so that the light passes therethrough.

17. The apparatus of claim 10 where the OC mirror is disposed on a proximal end of the first adjustable element.

18. The apparatus of claim 9 wherein the first adjustable element is a first Risley wedge pair, the first Risley wedge pair having a Risley axis therethrough, wherein the first support fixes the Risley axis substantially parallel to the axis.

19. The apparatus of claim 9 wherein the first recess is a trench and the first support is formed from a same material as the substrate.

20. The apparatus of claim 9 wherein the two inner sides of the first support join together to form a V-block, and wherein the two inner sides of the second support join together to form a V-block.

21. The apparatus of claim 10, wherein the third recess comprises a first concave recess formed in the substrate, wherein the HR mirror is disposed in the first concave recess.

22. The apparatus of claim 9 wherein the wavelength shifting component is further adapted to reflect light at the second wavelength.

23. The apparatus of claim 10 wherein the substrate comprises a fourth recess shaped into the substrate, the fourth recess having a fourth radius, wherein the HR mirror is disposed in the third recess and the OC mirror is disposed in the fourth recess, the OC mirror having a spherically shaped bottom with substantially the fourth radius, which allows rotation in a pitch and a yaw direction with respect to the axis prior to being immovably fixed.

24. The apparatus of claim 22, wherein the second adjustable element has a first end and a second end, the first end closer to the HR mirror than the second end.

25. The apparatus of claim 22, wherein the second adjustable element has a first end and a second end, the first end closer to the HR mirror than the second end, the second end closer to the OC mirror than the first end.

26. The apparatus of claim 22, wherein the OC mirror is disposed on a distal end of the second adjustable element.

27. The apparatus of claim 22, wherein the OC mirror is disposed on a proximate end of the second adjustable element.

28. The apparatus of claim 23, further comprising:
a fifth recess formed in the substrate and having a fifth radius;
a Q-switch disposed along the axis between the HR mirror and the OC mirror, the Q-switch having a fifth surface shaped substantially to match the fifth radius of the fifth recess such that the Q-switch is rotatable in a pitch and a yaw direction with respect to the axis to align the Q-switch prior to being immovably affixed in the third recess.

29. A method for manufacturing a laser resonator, the method comprising:
pre-aligning an HR mirror, a gain element, a first adjustable element and an output coupler (OC) mirror on a common substrate along an axis to form the resonator, wherein the HR mirror, the gain element, the first adjustable element, and the OC mirror are immovably affixed to the common substrate subsequent to the pre-aligning;
exciting the resonator to provide a laser output;
aligning the first adjustable element by rotating about and with respect to the axis while monitoring the laser output, wherein the first adjustable element is disposed on a first support that is disposed at least partially within a first recess of the common substrate, the first support being immovable with respect to the common substrate and having two inner sides upon which the first adjustable element is entirely supported; and
affixing the first adjustable element in a rotation position once a threshold in the laser output is reached.

30. The method of claim 29 where the HR mirror, the gain element and the OC mirror are affixed to the common substrate after the step of pre-aligning and before the step of affixing the first adjustable element.

31. The method of claim 29 where the HR mirror, the gain element and the OC mirror are affixed to the common substrate after the step of aligning the first adjustable element.

32. The method of claim 29 wherein the pre-aligning comprises pre-aligning a Q-switch on the common substrate between the HR mirror and the OC mirror, the Q-switch disposed within a second recess having a second radius formed in the common substrate, the Q-switch having a second surface shaped substantially to match the second radius of the second recess such that the Q-switch is adjustable in a pitch and a yaw direction with respect to the axis to align the Q-switch prior to being immovably affixed in the first recess.

33. The method of claim 32, wherein a third recess and a fourth recess are formed in the common substrate, the HR mirror and the OC mirror are disposed, respectively, in the third recess and the fourth recess and have surfaces shaped substantially to match to allow rotation in a pitch and a yaw direction with respect to the axis.

34. The method of claim 29, wherein the pre-aligning includes pre-aligning a second adjustable element, and wherein the aligning includes aligning the second adjustable element by rotating about and with respect to the axis while monitoring the laser output, wherein the second adjustable element is disposed on a second support that is disposed at least partially within a second recess of the common substrate, the second support being immovable with respect to the common substrate and having two inner sides upon which the second adjustable element is entirely supported, and wherein the affixing includes affixing the second adjustable element in a second rotation position once a threshold in the laser output is reached.

35. The method of claim 34, wherein the common substrate comprises a third recess shaped into the common substrate, the third recess having a third radius, and wherein the HR mirror or the OC mirror is disposed in the third recess and has a spherically shaped bottom with substantially the third radius, which allows rotation in a pitch and yaw direction with respect to the axis prior to being immovably fixed.

36. The method of claim 35 wherein the third recess has a rim therearound.

37. The method of claim 36 where the common substrate has a top, the top opposite a bottom, where the rim encircles a surface extending between the top and the bottom.

38. The method of claim 34, wherein the first adjustable element is a first Risley wedge pair, the first Risley wedge pair having a Risley axis therethrough, wherein the first support fixes the Risley axis substantially parallel to the axis.

39. The method of claim 38 wherein the first support comprises a mechanical support having two angled sides and formed of a same material as the common substrate.

40. The method of claim 39 wherein the second support comprises a mechanical support having two angled sides and formed of the same material as the common substrate.

41. The method of claim 39 where the mechanical support is a V-block.

42. The method of claim 38 wherein the common substrate comprises a first concave recess formed in the common substrate, wherein the gain element is disposed in the first concave recess.

43. A method for manufacturing an eye-safe laser resonator, the method comprising:

pre-aligning an HR mirror, a first adjustable element, a gain element, an intermediate (HR/HT) mirror, a second adjustable element and an output coupler (OC) mirror on a common substrate along an axis to form the resonator, wherein the HR mirror, the first adjustable element, the gain element, the HR/HT mirror, the second adjustable element, and the OC mirror are immovably affixed to the common substrate subsequent to the pre-aligning;

exciting the resonator to provide a laser output;

aligning the first and the second adjustable elements by rotating about and with respect to the axis while monitoring the laser output, wherein the first and second adjustable elements are disposed on first and second supports, respectively, that are disposed at least partially within corresponding first and second recesses of the common substrate, the first and second supports being immovable with respect to the common substrate and with each having two inner sides upon which the corresponding first and second adjustable elements are entirely supported; and affixing the first and the second adjustable elements in fixed rotation positions once a threshold in the laser output is reached.

44. The method of claim 43 wherein the common substrate has a third and a fourth recess adapted to support the HR mirror and the OC mirror, respectively, having spherical bottoms thereon adapted to mate to the third and the fourth recesses, respectively.

45. The method of claim 43 wherein the first and the second adjustable elements are a first and a second Risley wedge pair, respectively, the first and second supports fixing the rotational axis of the first and the second Risley wedge pairs substantially parallel to the axis.

46. The method of claim 45 wherein the first and the second supports are formed of a same material as the common substrate.

47. The method of claim 45 wherein the first and the second supporting means are V-blocks.

48. A laser resonator manufactured according to the method of claim 29, wherein the laser resonator further comprises:

an optic having a spherical bottom, the optic adapted to rotate in pitch and yaw with respect to the axis, the optic having either the HR mirror or the OC mirror thereon, the spherical bottom of the optic adapted to mate with a spherical recess of the common substrate, wherein the light reflected off the HR mirror passes through the gain element and partially through the OC mirror to form a laser output, wherein the optic is fixed in a rotation position once a threshold in the laser output is reached.

49. The laser resonator Of claim 48 wherein the optic has the HR mirror thereon and wherein the laser resonator further comprises a second optic having a spherical bottom, the second optic adapted to rotate in pitch and yaw with respect to the axis, the second optic having the OC mirror thereon, the spherical bottom of the second optic adapted to mate with a second spherical recess of the common substrate, wherein the light reflected off the HR mirror passes through the gain element and partially through the OC mirror to form a laser output, wherein the second optic is fixed in a rotation position once a threshold in the laser output is reached.

50. The laser resonator of claim 48 further comprising a Q-switch disposed between the HR mirror and the OC mirror.

51. An eye-safe laser resonator manufactured according to the method of claim 43, wherein the eye-safe laser resonator further comprises:

an optical parametric oscillator (OPO) crystal adapted to shift a light at a first wavelength to a light at a second wavelength, the OPO crystal disposed between the gain element and the OC mirror;

a first and a second spherical recess disposed within the common substrate; and a first and a second adjustable optic each having a spherical bottom, the first and the second adjustable optics adapted to rotate in pitch and yaw with respect to the axis, the first adjustable optic having either the HR mirror or the HR/HT mirror disposed thereon, the second adjustable optic having either the HR/HT mirror or the OC mirror disposed thereon, the spherical bottoms of the first and the second adjustable optics adapted to mate with and be supported by the first and second spherical recesses, respectively, wherein the light at the first wavelength reflects off the HR mirror, passes through the gain element, is shifted to the second wavelength by the OPO crystal and partially transmitted through the OC mirror to form a laser output of the light at the second wavelength, wherein the first and second adjustable optics are fixed in rotation positions during manufacture once a threshold in the laser output is reached.

52. The laser resonator of claim 51 further comprising a Q-switch disposed between the HR mirror and the OC mirror.

53. An eye-safe monoblock laser resonator manufactured according to the method of claim 43, wherein the laser resonator further comprises:

a first, a second, and a third spherical recess formed within the common substrate;

an optical parametric oscillator (OPO) crystal adapted to shift a light at a first wavelength to a light at a second wavelength, the OPO crystal disposed between the gain element and the OC mirror;

a first, a second, and a third adjustable optic, each having a spherical bottom, the first, the second, and the third adjustable optics adapted to rotate in pitch and yaw with respect to the axis, the first adjustable optic having a the HR mirror disposed thereon, the second optic having the HR/HT mirror disposed thereon, and the third adjustable optic having the OC mirror disposed thereon, the spherical bottoms of the first, and the second, and the third adjustable optics adapted to mate with the first, the second, and the third spherical recesses in the substrate, respectively, wherein the light at the first wavelength reflects off the HR mirror, passes through the gain element, is shifted to light at the second wavelength by the OPO crystal partially transmitted through the OC mirror to form a laser output of light at the second wavelength, wherein the first, the second, and the third adjustable optics are fixed in rotation positions during manufacture once a threshold in the laser output is reached.

54. The laser resonator of claim 53 further comprising a Q-switch disposed between the HR mirror and the OC mirror.

* * * * *